United States Patent

[11] 3,587,522

[72] Inventor John A. Baskwell
 Winchester, England
[21] Appl. No. 702,977
[22] Filed Feb. 5, 1968
 Division of Ser. No. 307,486, Sept. 9, 1963,
 Pat. No. 3,444,016
[45] Patented June 28, 1971
[73] Assignee Pirelli General Cable Works Limited
 London, England
[32] Priority Sept. 19, 1962
[33] Great Britain
[31] 35 658/62

[54] SHEATHING OF ELECTRIC CABLES
 4 Claims, 3 Drawing Figs.
[52] U.S. Cl............................................. 118/50,
 118/408
[51] Int. Cl...................................................... B05c 7/06

[50] Field of Search......................................... 118/408,
 50, (DIG. 10); 141/311, 383; 53/109;
 18/(Inquired); 174/25; 277/(Inquired), 59;
 156/48, 51; 137/68

[56] References Cited
 UNITED STATES PATENTS
 982,860 1/1911 Peelle............................ 53/109X
 2,867,544 1/1959 Hall............................... 118/408X
 1,118,649 11/1914 Halter........................... 137/68
 2,538,562 1/1951 Gustin et al................... (118/DIG. 10)

Primary Examiner—John P. McIntosh
Attorney—Marn & Jangarathis

ABSTRACT: For the manufacture of sheathed, oil-filled cables by either presheathing impregnation with oil or postsheathing impregnation with oil, a plug is disclosed as a device for sealing the cable end and for providing a connecting path to the cable interior.

PATENTED JUN 28 1971

3,587,522

INVENTOR
J. A. BASKWELL

BY MARN & JANGARATHIS
ATTORNEYS

SHEATHING OF ELECTRIC CABLES

This application is a division of my copending U.S. Pat. application, Ser. No. 307,486, filed Sept. 9, 1963, for SHEATHING OF ELECTRIC CABLES now U.S. Pat. No. 3,444,016.

The present invention relates to the sheathing of electric cables of the type in which the insulation is impregnated with an oil or other fluid, normally referred to as oil-filled cables.

Prior to impregnation, the cable must be subjected to a drying operation and this is normally performed under vacuum in a heated tank. According to British Pat. specification No. 827,410, one mode of procedure consists in impregnating the cable while it is still in this tank and prior to sheathing, hereinafter referred to as mass impregnation; in another mode of procedure, it may be vacuum dried, then sheathed, and finally impregnated, designated hereinafter as post impregnation. In either case, it has been common practice to allow air to enter the tank so that the cable may be removed from the tank and passed through sheathing apparatus or into its sheath if a preformed sheath be employed.

If the cable be mass impregnated, it is advantageous to prevent air entering the cable or making contact with the impregnating fluid therein during transfer from the tank to the sheathing apparatus or the preformed sheath as the case may be. If post impregnation be adopted, after sheathing, the cable must be reevacuated in order that impregnation may be carried out, but this involves an additional process step.

In parent application Ser. No. 307,486, out of which the present application is divided, there are described and claimed apparatus and processes having as their object the avoidance of the above access of air or the necessity for the second evacuation, as the case may be, by enabling the cable, during its transfer from the tank to its sheath, to be maintained immersed in the impregnating fluid (hereinafter referred to as oil) if mass impregnated or under vacuum if post impregnated.

For this purpose, the vacuum-drying tank is connected with the sheathing apparatus or with a preformed sheath, as the case may be, by a pipe adapted to be filled with oil or evacuated as required respectively for mass or for post impregnation. A plug, having packing to make contact with the inside of the sheath, attached to the leading end of the cable while still in the tank, is connected by a chain or the like to another similar plug, adapted to be drawn through the sheath by such means as a winch or by the tension exerted by the sheathing machine via the sheath; the cable is thus drawn from the drying tank into the sheath as described below, whether the latter be produced in situ or preformed. In any case, the cable remains immersed in oil or under vacuum as required.

During treatment of the cable in the vacuum-drying tank, the plug first mentioned above projects through a fitting, suitably of cylindrical form, secured over an aperture in the tank wall so as to constitute the tank mouth. This fitting serves to connect the tank to the tube leading to the sheathing apparatus or sheath and includes a sealing element for making fluidtight contact around the plug when the latter is positioned within the tank mouth, as described in greater detail in parent application Ser. No. 307,486. Once the tube has been secured to the tank mouth by means of the fitting and filled with oil or evacuated, as the case may be, through a suitable aperture the seal is released.

Travel of the cable through this tube is then initiated by operation of the above-mentioned winch or the like on the second-mentioned plug, traction being transmitted from the latter to the first-mentioned plug by the connecting chain. The second-mentioned plug enters the sheathing apparatus and makes fluidtight contact with the sheath and time must then be allowed for filling the connecting tube with oil or establishing a vacuum therein, according to requirements, while permitting travel of the second-mentioned plug within the sheath to continue: this is achieved by a chain normally resting in a depending chain box and of appropriate length so that the required interval of time occurs between start of movement of the second-mentioned plug and that of the first-mentioned plug and of the cable attached to it as also described in greater detail in parent application Ser. No. 307,486. As the first-mentioned plug enters the sheath, it makes fluidtight contact therewith and therefore takes over from the second-mentioned plug the function of sealing the connecting tube and the drying tank and the second-mentioned plug may then be removed. The trailing end of the sheathed cable is of course eventually sealed by a further plug.

In manufacture by the mass impregnation technique, means must be provided for compensating for volume changes of the oil due to temperature variation: conversely, in the case of manufacture by the postimpregnation technique, provision must be made to eliminate possible air leakage past the rearmost of the two forward plugs, that is the one behind the chain, and to permit impregnation after the sheathing operation.

To these ends, the plug sealing the cable end may be provided with means permitting a connection to be made to the cable interior. For example, there is fitted in the plug a manually adjustable valve-controlling passages in the plug leading from an aperture in its periphery to which appropriate connections may be made. Thus, in mass impregnation, the peripheral aperture in the plug may be connected to a pressurized oil reservoir, the valve being adjusted to open the passage giving access to the cable insulation: thus, the required compensating effect is afforded.

In postimpregnation, to maintain fluidtightness between the rearmost of the two forward plugs and the sheath, there may be provided two or more packing rings and between them a groove and passageway in the plug leading forwardly from the groove to another peripheral aperture to which appropriate vacuum connection may be made so that any air leaking past either packing ring is removed. This action may also be taken while the plug is located within the fitting constituting the tank mouth. Subsequently, when the cable has been sheathed, the first-mentioned aperture may be connected to a source of impregnating oil and the valve adjusted to allow flow of the latter through a passage giving access to the cable insulation.

As will be appreciated from the above, the construction of the plug sealing the leading end of the cable is of considerable importance to the successful operation of the mass and post impregnation apparatus and processes of parent application Ser. No. 307,486. In postimpregnation in particular, the plug serves the dual function of both acting as a vacuum seal for the sheathed and initially evacuated cable and as a means whereby the impregnating oil can be subsequently fed into the cable without the necessity of further intermediate evacuating steps.

The present invention accordingly provides a plug for securement to an electric cable, the plug having a cylindrical surface on which can be sealed the end of the cable sheath, a passageway extending through the plug from the exterior of the plug to the cable core within the sheath, and means releasably closing the passageway.

The present invention also provides a plug for securement to an electric cable, the plug having a recess for receiving the end of the cable core, a cylindrical surface around the recess on which can be sealed the end of the cable sheath, a passageway extending between the recess and the exterior of the plug, and means releasably closing the passageway.

The present invention also includes the resulting combination of a sheathed electric cable and a pair of end plugs each constructed in accordance with the present invention.

In order that the present invention may be more clearly understood, reference will now be made to the accompanying drawings, in which.

Figure 1:
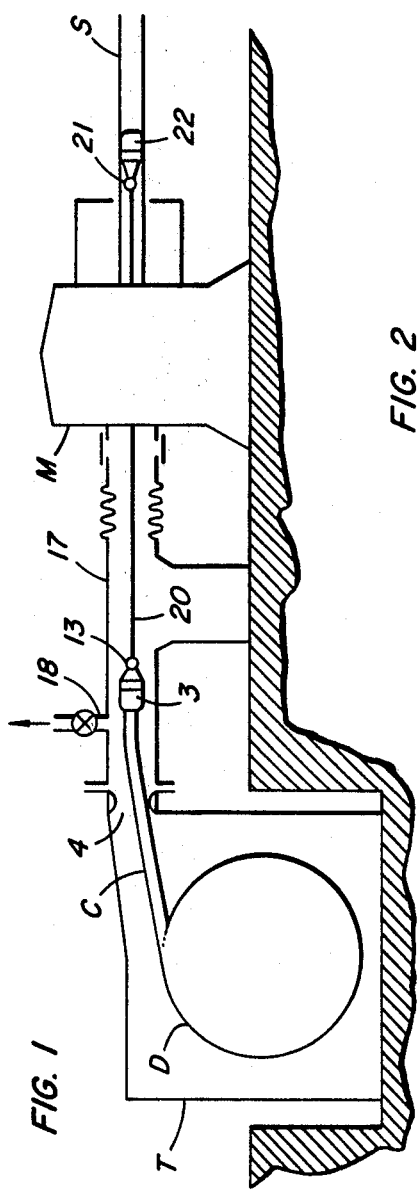
FIG. 1 represents in block schematic form a view of a whole apparatus for carrying out processes in accordance with application Ser. No. 307,486.

As shown in diagrammatic form in FIG. 1, the apparatus for carrying out both mass impregnation and postimpregnation with a continuously formed sheath comprises a tank T containing a cable C to be sheathed wound on a drum D mounted in the tank. A sheath S is continuously formed about the cable C by a sheathing press M and the cable is drawn from the tank T to the machine through a connecting tube or pipe 17 having a side aperture 18 through which vacuum can be created in the tube by connection to a suction source, or through which the tube may be filled with oil as the case may be.

Figure 2:
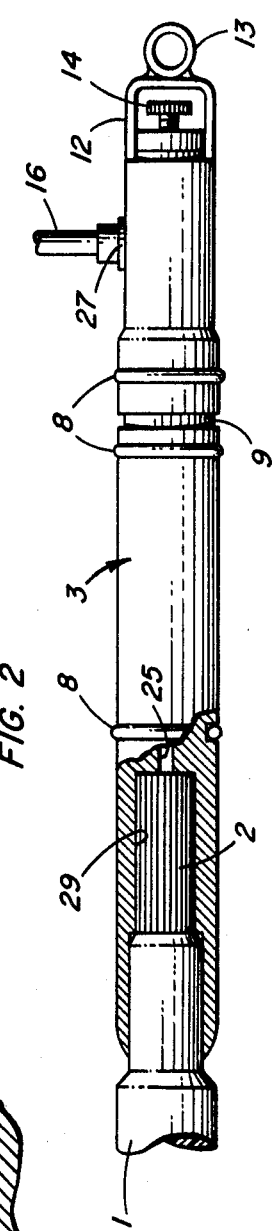
FIG. 2 represents a view principally in elevation of the plug sealing the leading end of the cable attached to the cable.

Referring now to FIG. 2, the leading end of the cable C, which has insulation 1 and a central conductor 2, is secured to a plug 3, by gripping of the cable core within a cylindrical axial recess 29 of the plug. The wall of the impregnating and/or drying tank T is formed with an aperture 4 around which is secured a cylindrical fitting so as to constitute jointly with the aperture a mouth for the tank, in which the plug 3 may be held in fluidtight manner by suitable means, so for example the packing element and inflatable seal disclosed in copending application Ser. No. 307,486. This application also describes other details of the apparatus.

To the free end of the plug 3 there is fixed a shackle 12 and ring 13 whereby a pulling chain 20 can be connected to the plug. This chain is connected in front to forward plug 22 including a pair of O-rings whereby it can form a hermetic seal with the cable sheath.

Figure 3:
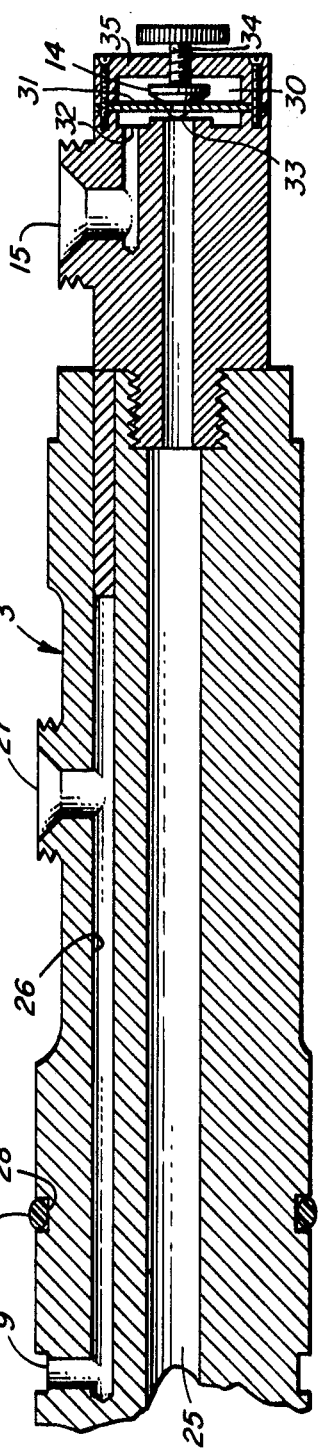
FIG. 3 represents a partial enlarged axial cross-sectional view through the plug.

FIG. 3 shows the inner structure of the plug 3, the shackle 12 and ring 13 being omitted from this view. A passage 26 leads from peripheral groove 9 located between O-rings 8 to an aperture 27 so that any air leaking past O-rings 8 into the groove can be removed by having aperture 27 connected to a vacuum source through a connecting tube 16. O-rings 8 are themselves contained in a further pair of peripheral grooves 28 in the plug surface. For use particularly in the postimpregnation method, the plug 3 is also fitted with a manually adjustable vacuum valve 14 controlling a central passage 25 within the plug leading from aperture 15 in the plug periphery to the interior of the cable. Oil pressure or vacuum can be applied to aperture 15.

Valve 14 comprises a chamber 30 and diaphragm 31, the chamber communicating at 32 with aperture 15 and at 33 with the open end of passage 25. Diaphragm 31 is actuated by hand screw 34 passing through the end wall 35 of the chamber and is movable between a closed position, in which it seeps against the open end of passage 25 so as to cut off communications between the passage 25 and aperture 15, and an open position, illustrated in FIG. 3, in which passage 25 is in communication via chamber 30 with aperture 15.

Use of the plug 3 will now be described in greater detail.

In carrying out a postimpregnation method with the apparatus shown, the plug 3 is secured to the leading end of the cable C and clamped in the mouth of the tank T so as to form a fluidtight connection therebetween the tank then being evacuated. The rear end of the connecting tube 17, previously connected at its far end to the core die of the sheathing press, is then joined to the tank mouth.

Forward plug 22 is then sealingly inserted by means of a draw wire (not shown) into an initial portion of sheath S already formed by the extrusion press M; vacuum is then applied to aperture 18 and the valve opened. Operation of the press is then continued so that the plug 22 is advanced and takes up the slack (normally resting in the depending chain box) of chain 20. Simultaneously tube 17 is being evacuated through aperture 18 so that by the time the chain 20 becomes taut and the forward tractive effort exerted by the progressively formed sheath S commences to be transmitted to the first plug 3 and the cable C, the tube is devoid of air. At this time, the plug 3 is released in the mouth of the tank from the sealing element (not shown) so as to effect communication between the evacuated tank T and the evacuated tube 17. The cable then progressively travels through the tube 17 in the same vacuum environment as in the tank up to and through the extrusion press where sheath S is continuously formed around it.

The trailing end of the cable C is provided with a suitable end plug with which the sheath can form a seal. The sheathing operation is thus completed when this end plug, after having been drawn from drum D through tube 17, emerges from the sheathing machine M with the sheath S sealed around it. The sheath can be cut off after the end plug and since the O-rings 8 of the first plug 3 form a hermetic seal with the sheath S, the sheath can also be cut in the zone between the plugs 3 and 22 so as to remove the chain 20 and recover plug 22.

The process thus far provides an evacuated system comprising the sheathed electric cable, the plug 3 and the end plug to which the leading and trailing ends of the cable are respectively sealed. The sheath around the plug 3 is then cut so as to provide access to the aperture 15 through which the cable can be filled with oil when desired after opening the valve 14.

In carrying out a mass impregnation method, the steps are similar except that the connecting tube 17 is filled with oil instead of being evacuated while the chain 20 is being uncoiled by the continuously formed sheath. Thus, when the end plug closing the trailing end of the cable C has emerged from the press M and the sheath cut as before between plugs 3 and 22, an oil-filled cable, its ends sealed by the plug 3 and the end plug is obtained. Oil under pressure can be supplied to the cable through aperture 14, valve 15 and passageway 25 to compensate for changes in the volume of oil due to temperature variation.

Mode of operation with preformed sheaths is described more fully in parent application Ser. No. 307,486. A principal difference is that the connecting tube 17 is absent and the cable core drawn into a preformed sheath, either evacuated or oil-filled according to whether postimpregnation or mass impregnation is being carried out respectively, and the sheath is then contracted around the cable as for example by means of a die so as to form a hermetic seal between itself, the plug 3, and the trailing plug. Plug 3 is then used as before to provide a passageway to the interior of the cable for supply of oil, either for filling the cable in the first instance or for compensating purposes as the case may be.

In another embodiment of the present invention, the plug 3 may be provided with an additional peripheral groove between guard ring 9 and rear O-ring 8 for reception of pawls pivoted to the mouth of the tank, to enable the plug to be held firmly in position during initial assembly of the apparatus. Other forms of valve means and internal passageways for the plug 3 whereby the sheathed cable can be filled or topped up with impregnating oil may of course be employed in place of the diaphragm-type valve and longitudinal passageway illustrated. The same type of plug can be used for plugs 3 and 22 and for the end plug closing the trailing end of the cable. However, only one of plug 3 and the end plug need have the passageway through which oil can be introduced.

I claim:

1. A sealing device for use in the manufacture of an oil-impregnated cable to seal the cable core end during sheathing and impregnation, comprising:

a generally elongated plug, including a recess in one end of said plug for receiving the end of the cable core, said one end of said plug having a cylindrical surface around said recess for engaging the interior surface of the cable sheath;

a chamber formed within said plug adjacent the other end of said plug, the exterior surface of said plug at said other end thereof including an aperture connected to said chamber;

a passage extending through said plug from said recess to said chamber for communicating said cable core to the exterior of said plug through said aperture;

valve means for controlling communication between said passage and said aperture; and sealing means mounted on said exterior surface of said plug between said aperture and said one end of the plug for effecting sealing between the interior surface of a cable sheath and the exterior surface of said plug.

2. A device for use in the manufacture of an oil-impregnated cable to seal the cable core end during sheathing and impregnation, comprising:
- a generally elongated plug, including a recess in one end of said plug for receiving the end of the cable core, said one end of said plug having a cylindrical surface around said recess for engaging the interior surface of the cable sheath;
- a chamber formed within said plug adjacent the other end of said plug;
- a passage extending through said plug from said recess to the chamber formed adjacent the other end of said plug, said chamber communicating said passage with the exterior of said plug;
- valve means mounted in said chamber for controlling the communication of said passage with the exterior of said plug;
- a pair of sealing means mounted around the peripheral surface of said elongated plug and longitudinally spaced from one another;
- a first port formed in said plug between said pair of sealing means;
- a second port formed in said plug between said sealing means and said other end of said plug; and
- a duct formed in said plug for communicating said first and second ports.

3. A device as claimed in claim 1 wherein each of said sealing means comprises a resilient O-ring mounted in an annular channel in said plug.

4. In combination with a sheathed cable core, at least one sealing device having one end thereof mounted in one end of the sheath in fluidtight engagement therewith and the other end thereof extending beyond said sheath;
said sealing device comprising:
- a generally elongated plug, including a recess in one end of said plug having the end of the cable core mounted therein, said one end of said plug having a cylindrical surface around said recess and against which the interior surface of said sheath is sealed;
- a chamber formed within said plug adjacent the other end of said plug, the exterior surface of said plug at said other end thereof including an aperture connected to said chamber;
- a passage extending through said plug from said recess to said chamber for communicating said cable core to the exterior through said aperture; and
- valve means for controlling communication between said passage and said aperture.